United States Patent
Jong et al.

(10) Patent No.: US 11,405,099 B2
(45) Date of Patent: Aug. 2, 2022

(54) SATELLITE BLOCKAGE TOLERANT COMMUNICATION

(71) Applicant: Hughes Network Systems, LLC, Germantown, MD (US)

(72) Inventors: James Jehong Jong, North Potomac, MD (US); Channasandra Ravishankar, Clarksburg, MD (US); Billy James Whitmarsh, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 97 days.

(21) Appl. No.: 16/718,303

(22) Filed: Dec. 18, 2019

(65) Prior Publication Data

US 2021/0194573 A1 Jun. 24, 2021

(51) Int. Cl.
*H04B 7/185* (2006.01)

(52) U.S. Cl.
CPC ..... *H04B 7/18536* (2013.01); *H04B 7/18513* (2013.01); *H04B 7/18534* (2013.01); *H04B 7/18563* (2013.01)

(58) Field of Classification Search
CPC ............ H04B 7/18536; H04B 7/18513; H04B 7/18534; H04B 7/18563
See application file for complete search history.

(56) References Cited

U.S. PATENT DOCUMENTS

| | | | | |
|---|---|---|---|---|
| 6,104,911 A | * | 8/2000 | Diekelman | H04B 7/18534 342/352 |
| 6,128,334 A | * | 10/2000 | Dapper | H04H 20/36 370/265 |
| 9,391,690 B2 | | 7/2016 | Jong et al. | |
| 2008/0260012 A1 | * | 10/2008 | Majonen | H04B 1/1027 375/227 |
| 2010/0322150 A1 | | 12/2010 | Wilcoscon et al. | |
| 2013/0028175 A1 | * | 1/2013 | Jong | H04B 7/18513 370/321 |

FOREIGN PATENT DOCUMENTS

| CA | 2215075 A1 | 3/1999 |
|---|---|---|
| EP | 2639155 A2 | 9/2013 |

OTHER PUBLICATIONS

ETSI TS 101 376-5-2 GEO-Mobile Radio Interface Specifications (Release 3); Radio interface physical layer specifications; Multiplexing and Multiple Access; GMR-1 3G 45.002.
C. Ravishankar, A. Morris, C. Barnett, A. Noerpel, and J. Jong, "Design and Performance of a 3G Mobile Satellite Systems," in Proc. IEEE Milcom'11, pp. 1946-1951, Nov. 2011.
Proakis "Digital Communications" fourth edition, McGrawHill.

(Continued)

*Primary Examiner* — Minh Trang T Nguyen
(74) *Attorney, Agent, or Firm* — Bejin Bieneman PLC

(57) ABSTRACT

Effects of communications blockages can be mitigated. A wireless communication transmitter comprises a processor and a memory. The memory stores instructions executable by the processor to, upon receiving a current data packet in a sequence of data packets, wirelessly transmit a burst to a second computer. The burst includes the current data packet and a previous data packet in the sequence.

20 Claims, 6 Drawing Sheets

(56) References Cited

OTHER PUBLICATIONS

Huan Yao et al.: "A Multi-Burst Transmission Strategy for Streaming Over Blockage Channels with Long Feedback Delay", IEEE Journal on Selected Areas in Communications, IEEE Service Center, Piscataway, US, vol. 29, No. 10, Dec. 1, 2011, pp. 2033-2043, XP0113272442, ISSN: 0733-8716, DOI: 10.1109/JSAC.2011.111213 Section I and IV.

International Search Report and Written Opinion for PCT/US2020/063236 dated Apr. 9, 2021 (11 pages).

* cited by examiner

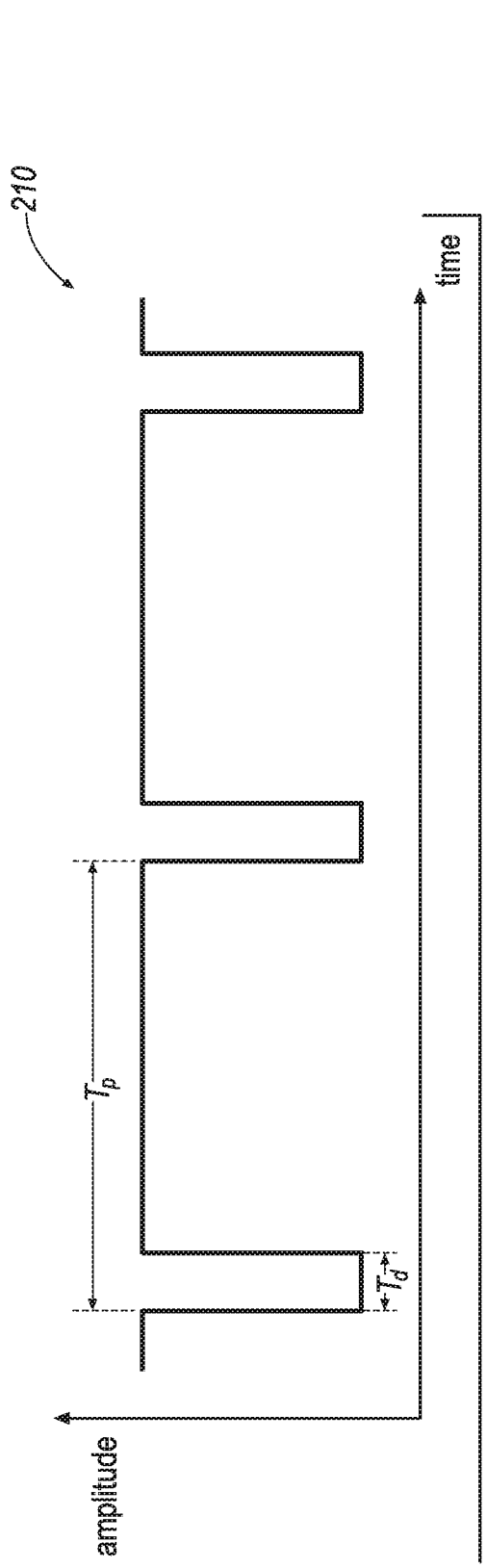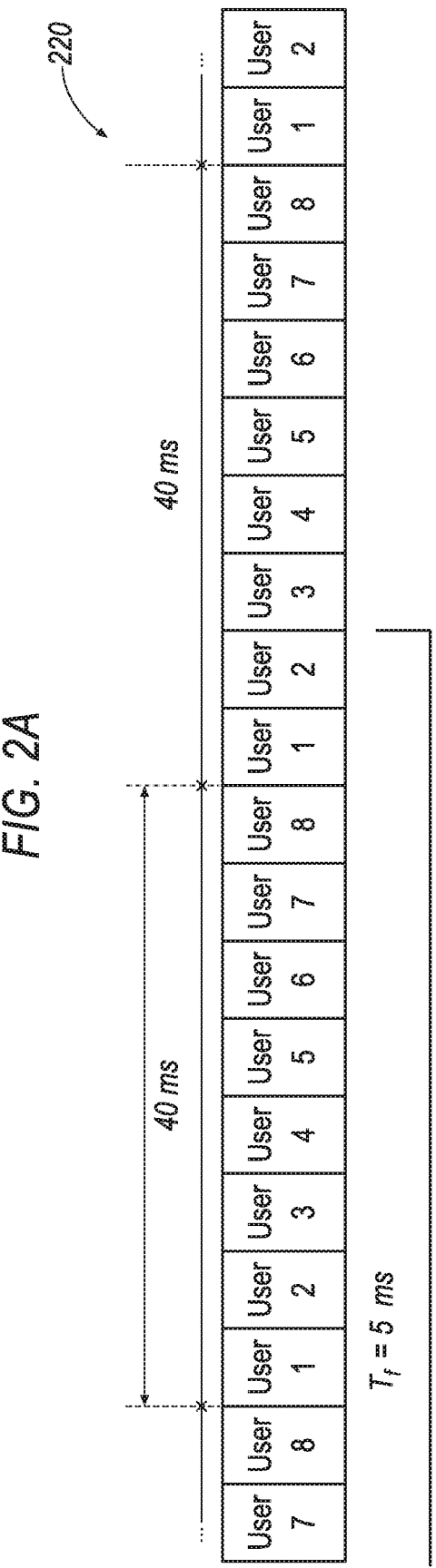
FIG. 2A
FIG. 2B

SATELLITE BLOCKAGE TOLERANT COMMUNICATION

BACKGROUND

Satellite communication is utilized for wireless communications via various protocols and/or media, e.g., Voice over Internet Protocol (VoIP), television broadcasting services, etc. An obstacle in a path between a satellite and an antenna may impair a satellite communication link between a satellite and the antenna. For example, a moving object such as an airplane or a helicopter blade may block a satellite link. Thus, a receiver computer may fail to receive the data transmitted during an impairment of the satellite link, e.g., during the time that a moving object blocked the satellite link.

BRIEF DESCRIPTION OF THE DRAWINGS

FIG. 2A is a graph illustrating interruptions in satellite communication by the rotating helicopter blade of FIG. 1.

FIG. 2B is a graph illustrating time-multiplexed user data transmission affected based on interruptions shown in FIG. 2A.

DETAILED DESCRIPTION

Introduction

Figure 1:
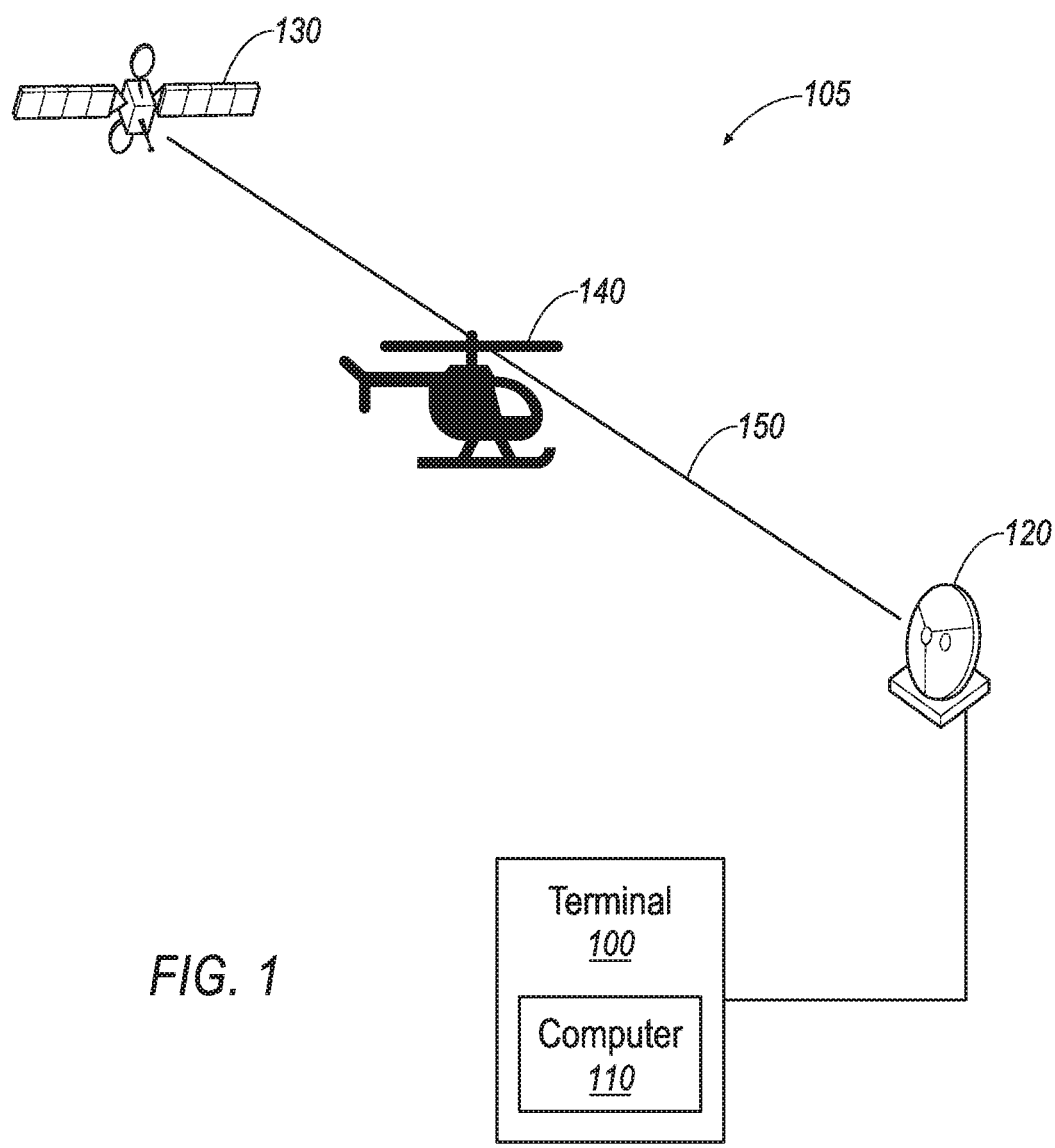
FIG. 1 illustrates an example satellite network and a rotating helicopter blade causing blockage in a satellite link.

Disclosed herein is a wireless communication transmitter comprising a processor and a memory. The memory stores instructions executable by the processor to, upon receiving a current data packet in a sequence of data packets, wirelessly transmit a burst to a second computer, wherein the burst includes the current data packet and a previous data packet in the sequence.

The instructions may further include instructions to digitally modulate the current data packet, digitally modulate the previous data packet, generate an aggregated data packet including the digitally modulated current data packet and the digitally modulated previous data packet, and then generate the burst including the aggregated data packet.

The instructions may further include instructions to generate an aggregated data packet including the current data packet and the previous data packet, digitally modulate the aggregated data packet, and then generate the burst including the digitally modulated aggregated data packet.

The instructions may further include instructions to transmit the burst upon receiving every other data packets, wherein the burst includes the current data packet and a plurality of previous data packets.

The instructions may further include instructions to digitally modulate each of the current and three previous data packets separately, generate an aggregated data packet including the digitally modulated current data packet and each of the separately digitally modulated previous data packets, and then generate the burst including the aggregated data packet.

The instructions may further include instructions to generate an aggregated data packet including the current data packet and each of the plurality of previous data packets, digitally modulate the aggregated data packet, and then generate the burst including the digitally modulated aggregated data packet.

The wireless communication transmitter may be one of a satellite or a satellite terminal.

The data packet may include a media data packet.

The media data packet may include a VoIP data packet.

The instructions may further include instructions to perform voice encoding, channel coding, scrambling, digitally modulating, aggregating, and burst formatting.

The digitally modulating may be performed before the aggregating.

Further disclosed herein is a method, comprising upon receiving, in a first computer, a current data packet in a sequence of data packets, wirelessly transmitting a burst to a second computer, wherein the burst includes the current data packet and a previous data packet in the sequence.

The method may further include digitally modulating the current data packet, digitally modulating the previous data packet, generating an aggregated data packet including the digitally modulated current data packet and the digitally modulated previous data packet, and then generating the burst including the aggregated data packet.

The method may further include generating an aggregated data packet including the current data packet and the previous data packet, digitally modulating the aggregated data packet; and then generating the burst including the digitally modulated aggregated data packet.

The method may further include transmitting the burst upon receiving every other data packets, wherein the burst includes the current data packet and a plurality of previous data packets.

The method may further include digitally modulating each of the current and three previous data packets separately, generating an aggregated data packet including the digitally modulated current data packet and each of the separately digitally modulated previous data packets, and then generating the burst including the aggregated data packet.

The method may further include generating an aggregated data packet including the current data packet and each of the plurality of previous data packets, digitally modulating the aggregated data packet, and then generating the burst including the digitally modulated aggregated data packet.

The method may further include performing voice encoding, channel coding, scrambling, digitally modulating, aggregating, and burst formatting, wherein the data packet includes a media data packet.

The digitally modulating may be performed before the aggregating. The media data packet may include a VoIP data packet.

Further disclosed is a computing device programmed to execute any of the above method steps.

Yet further disclosed is a computer program product comprising a computer-readable medium storing instructions executable by a computer processor, to execute any of the above method steps.

Exemplary System Elements

As disclosed herein, a satellite link between a satellite and a terminal may be interrupted by a moving object, e.g., a rotating helicopter blade, preventing or impairing data communication between the satellite and the terminal. A computer can be programed, upon receiving a current data packet in a sequence of data packets, to wirelessly transmit a burst to a second computer, wherein the burst includes the current data packet and a previous data packet in the sequence.

As illustrated in FIG. 1, a satellite network 105 includes one or more terminals 100 and one or more satellites 130, each of which typically includes one or more computers 110. For example, each terminal 100 or satellite 130 can include a computer 110. A computer 110 is a machine including a processor and memory. A computer memory can be implemented via circuits, chips or other electronic components and can include one or more of read-only memory (ROM), random access memory (RAM), flash memory, electronically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field-programmable gate arrays (FPGAs), one or more application-specific integrated circuits (ASICs), one or more digital signal processors (DSPs), one or more customer-specific integrated circuits, etc. The processors in computers 110 may be programmed to execute instructions stored in the memory to carry out actions of the terminal 100, satellite 130, as discussed herein.

The satellites 130 collectively form a constellation (i.e., a group) of network nodes whose position may change relative to one another, to the ground, or both. The satellite 130 includes various circuits, chips, or other electronic components. Satellite 130 may be in low Earth orbit (LEO) in multiple planes and orbits relative to one another. In the present context, a "direct communication" is a communication between a satellite 130 and an antenna 120 via a satellite link 150 which is substantially along an imaginary straight line between the satellite 130 and the terminal 100 antenna 120.

In the present context, a satellite link 150 is a wireless communication between an antenna of a terminal 100 and a satellite 130 antenna. A satellite link 150 is typically established upon configuring a terminal 100 modulator, demodulator, encoder, and/or decoder of a terminal 100 to communicate with a satellite 130.

In the present context, a satellite link 150 may include an uplink, i.e., communication from the terminal 100 to a satellite 130 and/or a downlink, i.e., communication from the satellite 130 to the terminal 100.

Each satellite 130 has a coverage area (not shown). In the present context, a coverage area of a satellite 130 is a geographical area on the surface of Earth, in which a terminal 100 may communicate with the respective satellite 130. Weather conditions, buildings, trees, etc., may partially or fully impair communication of a terminal 100 with a satellite 130 within a respective coverage area. Additionally, a moving object 140 such a helicopter blade object 140 may cause interruptions in a satellite link 150 communication, as discussed with reference to FIGS. 2A-2B.

A terminal 100, e.g., very small aperture terminals (VSAT), is a computer-based communication device implemented via circuits, chips, antennas 120, or other electronic components that can communicate with satellite 130 that are within communication range of the terminal 100. In some instances, the terminals 100 are stationary relative to a location on Earth. In other instances, the terminals 100 are mobile, meaning that the terminals 100 move relative to a location on the Earth. In one example, a terminal 100 may be mounted to a helicopter (not shown in FIG. 1), thus rotating blade object 140 of the helicopter may cause an interruption in a satellite link 150 between a satellite 130 and the terminal 100 mounted to the helicopter. In some instances, the terminal 100 may provide an interface between a satellite 130 and other ground-based communication devices. For instance, the terminal 100 may receive communications from a satellite 130 and transmit such communications via terrestrial-based communication channels. Likewise, the terminals 100 may receive communications via a terrestrial-based communication channel and transmit the communication to a satellite 130.

The antenna 120 may include a low-noise block down-converter (LNB) mounted on a dish, which may collect radio frequency (RF) signals from the dish and convert the collected RF signal to a signal which is sent through a wired connection to the terminal 100. The dish is physically mounted to the LNB and is stationary relative to the LNB. The antenna 120 may be a combination of low-noise amplifier, frequency mixer, local oscillator, and intermediate frequency (IF) amplifier. The antenna 120 may include a Block Up-Converter, e.g., a single stage or a multi-stage Up-Converter, for increasing a carrier frequency of RF signal to be transmitted via a satellite link 150.

The antenna 120 serves as a radio frequency (RF) front end of a terminal 100, receiving a microwave signal from a satellite 130 collected by the dish, amplifying the received signal, and converting the block of frequencies to a lower block of intermediate frequencies (IF). This conversion of RF to a lower block of IF allows the signal to be carried, typically via a wired connection, to a terminal 100. An antenna 120 typically includes a sender antenna configured to send RF signal to a satellite 130, and/or a receiver antenna configured to receive RF signal from a satellite 130.

As shown in FIG. 1, a moving object 140 such as a rotating helicopter blade object 140 may interrupt (or block) a satellite link 150. An interruption or blockage, in the present context, is an obstruction of an RF signal that measurably impairs the transmission of the signal between an antenna 120 and a satellite 130 caused by an object 140. As discussed below, a blockage may be determined, e.g., as "full" or "partial." An amplitude of the RF signal may be measured in electromagnetic energy units such as decibel milliwatts (dBm), e.g., −130 dBm. A blockage condition may be determined by comparing the RF signal amplitude to one or more thresholds. For example, in a partial blockage condition, an amplitude of a RF signal communicated via a satellite link 150 is less than a first amplitude threshold, e.g., −132 dBm, and, in a full blockage condition, an amplitude of the RF signal is less than a second amplitude threshold, e.g., −145 dBm.

FIG. 2A is a graph 210 showing changes of an RF signal amplitude of a satellite link 150 caused by a rotation of a helicopter blade object 140 (FIG. 1). The graph 210 shows an interruption period $T_p$, e.g., 40 ms, and an interruption length (or duration) $T_L$, e.g., 5 ms. In the present context, an interruption period $T_p$ is a time between two consecutive interruptions caused by the moving object and an interruption length $T_L$ is a time during which the satellite link 150 is blocked by an object, e.g., the rotating helicopter blade object 140. Although not shown in FIG. 2A, an interruption, in the present context, may be a result of distortion, refraction, and/or Doppler effect caused by a moving object 140. A moving object 140, e.g., a blade object 140, may cause distortion of a radiofrequency signal of the satellite link 150. Distortion, in the present context, is an alteration of a waveform of a radiofrequency information-bearing signal of a satellite link 150. Additionally or alternatively, a refraction of the radiofrequency signal may be caused around an object 140 and/or a Doppler effect may be caused by motion of the blades object 140. A refraction is a change in a direction of signal caused by a change of medium through which the signal is transmitted. Doppler effect or Doppler shift is a change in frequency of a wave in relation to a receiver that is moving relative to a wave transmitter.

As shown in FIG. 2A, interruptions may occur periodically based on a rotational speed of the helicopter blade object 140. The interruption period $T_p$ is based on a number of blades and a rotational speed of the blades. Thus, a first helicopter with four blades 140 produces an interruption period $T_p$ that is half of the interruption period $T_p$ of a second helicopter having two blades 140 rotating with the same speed as the blades 140 of the first helicopter. Typically, the interruption period $T_p$ caused by a helicopter blade object 140 is within a range of 40 to 80 ms.

The interruption length (or duration) $T_L$ is based on dimensions (length and width) of, e.g., a blade object 140 passing through the satellite link 150, and a speed of the rotationally moving object 140. Typically, the interruption length $T_L$ caused by a helicopter blade object 140 is within a range of 4 to 8 ms. The interruption length $T_L$ is further based on a radio wavelength of the satellite link 150. For example, for radiofrequency (RF) L-band satellite communications, or higher, a wavelength of wireless waves transmitted via the satellite link 150 is comparable enough to dimensions of the blade to cause full and/or partial blockage due to signal reflections from the blade. In the present context, fading is a partial blockage of the wireless signal but not a full blockage. In this context, "comparable" means substantially equal, e.g., within a range of 10% less or more than the blade width.

A satellite communication network 105 may implement media data communication, e.g., Voice over Internet Protocol (VoIP), for transmitting media data. Media data may include video and/or audio data, e.g., a phone communication. Typically, during a phone call, a user may recognize a loss of voice data even when a blockage occurs for a short period of time, e.g., more than 50 milliseconds (ms).

In one example, data (e.g., media data such as video and audio) for multiple users may be transmitted via a satellite link 150 using a time multiplexing technique, e.g., TDMA (Time-Division Multiplex Access). FIG. 2B is an example graph 220 illustrating transmission of data packets for multiple users, e.g., User 1 to User 8. In a TDMA-based communication, a time slot, e.g., 5 ms, may be planned for each specific user. A data packet, in the present context, is a unit of data made into a package that travels along a given network path, e.g., one or more satellite links 150, Ethernet network, Internet, etc. Data packets are used in various types of network protocols, e.g., Internet Protocol (IP).

As illustrated in example graph 220, based on the interruption period $T_p$ and the time slot planned for a user, e.g., User 8, communications can be repeatedly interrupted by a moving object such as the rotating blade object 140. "Repeatedly interrupted" means more than two consecutive transmissions of a data packet associated with same user are interrupted by a moving object 140. Interruption of data packets may degrade voice quality in a received transmission of packets. For example, words in a received voice transmission could sound garbled or could be missing.

Figure 3:
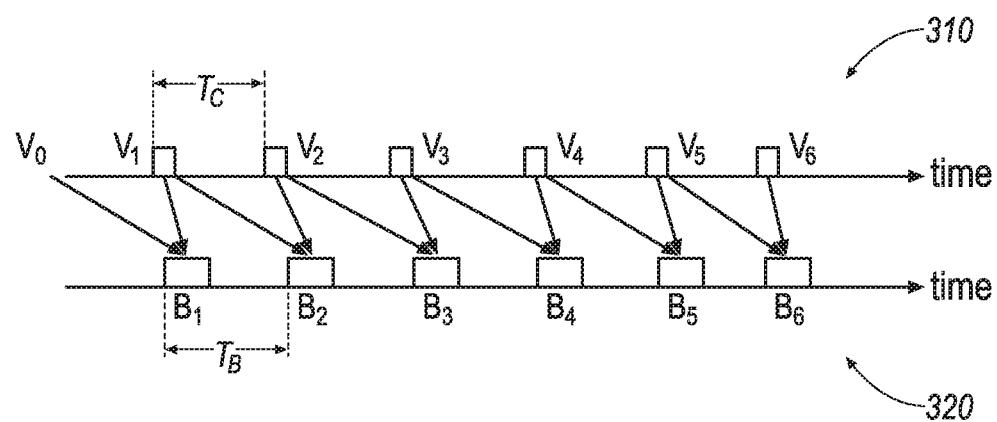
FIG. 3 shows a first graph of a sequence of data packets for transmission via the satellite link and a second graph of a sequence of bursts, each including a current and a previous data packet.

FIG. 3 shows, in graph 310, an example sequence of data packets $V_0, V_1, \ldots, V_n$, e.g., including media data such as voice, video, etc. The data packets $V_i$ may be generated based on a data packet cycle time $T_C$, e.g., 20 ms. In one example, a computer 110 may be programmed to perform voice encoding to generate media data packets $V_i$. Voice encoding is a process of converting input analog audio signal to a binary voice data packet $V_i$. For example, a computer 110 may be programmed to sample an input audio signal and convert the sampled audio signal using an Analog-to-Digital Converter (ADC) circuit. FIG. 3 further shows, in graph 320, an example sequence of bursts $B_i$ for transmitting the data packets $V_i$.

A burst $B_i$ includes a (i) payload and (ii) information specifying time of transmission and frequency of transmission, and/or time slot for transmission. Thus, a burst $B_i$ is in digital format (or digital domain) including payload and information specifying how (i.e., with respect to RF amplitude, frequency, time slot, etc.) the payload is to be transferred wirelessly. A "payload," as is conventionally understood, is the data content being transmitted, i.e., data packets $V_i$ have payloads including media data such as voice, video, etc.

In the present context, "burst formatting" means forming a burst $B_i$ by placing payload, UW (Unique Word) symbols, and guard symbols in addition to specifying burst times (i.e., times of starting and ending a burst $B_i$ transmission), frequencies (e.g., a satellite link 150 communication frequency), and power levels specified in a complex format including real and imaginary values I, Q. A power level of a complex valued is $I^2+Q^2$. For example, when I=Q=10, the power level is 200 or when I=Q=1024, the power level is 2097152.

A "unique word," in the present context, is a combination of amplitude and phase of communication. A guard symbol is a specified symbol that is used to reduce a likelihood of misdetection of received payload data on a receiver side, e.g., a computer 110 in a terminal 100 or a satellite 130. For example, a guard symbol may be a specified start bit pattern and/or an end bit pattern.

A burst $B_i$ is typically transmitted according to a burst cycle time $T_B$. In one example, illustrated in FIG. 3, the data packet cycle time $T_C$ and the burst cycle time $T_B$ may be the same, e.g., 20 ms. In another example, as discussed with reference to FIGS. 4-5, the burst cycle time $T_B$ may be different from the data packet cycle time $T_C$. In one example, with reference to FIG. 2A, if blockages caused by a moving object 140 occur with an interruption period $T_p$, e.g., 40 ms, then the blockages could be aligned with (i.e., occur at a same time as) the bursts $B_1, B_3, B_5, \ldots$ or $B_2, B_4, B_6, \ldots$, resulting in a 50% blockage probability. In another example, if the interruption period $T_p$ is 80 ms, the blocking probability may be 25%.

To prevent a loss of data due to blockage caused by a moving object 140, a computer 110 in a wireless communication transmitter, e.g., a satellite 130A, a terminal 100, etc., can be programmed, upon receiving a current data packet $V_i$ in a sequence of data packets $V_0, V_i, \ldots, V_n$, to wirelessly transmit a burst $B_i$ to a second computer 110, e.g., at a terminal 100, a satellite 130A, etc. In this example, the burst $B_i$ includes the current data packet $V_i$ and a previous data packet $V_{i-1}$ from the sequence of the data packets $V_0, V_1, \ldots, V_n$. Data packet $V_0$ is a dummy data packet, i.e., it includes no payload.

With reference to the graph 320, each burst $B_i$ includes a previous data packet $V_{i-1}$ and a current voice packet $V_i$. Thus, the data packets $V_1, V_2, V_3, \ldots$ can be recovered in a presence of interruptions on bursts $B_1, B_3, B_5, \ldots$ or burst $B_2, B_4, B_6, \ldots$ respectively, resulting in a recovery of data packets $V_0, V_1, \ldots, V_n$. "Recovered" means receiving the data packet $V_i$ on a receiver-side without loss, i.e., canceling an effect of a blockage of the satellite link 150.

For example, if the burst $B_2$ is lost because of a blockage, then the data packets $V_1, V_2$ included in the burst $B_2$ can be recovered at the receiver-side because the data packet $V_1$ is also included in the burst $B_1$ and the data packet $V_2$ is also included in the burst $B_3$. In downlink communication via a satellite link 150, a transmitter may be a satellite 130 computer 110 and a receiver-side computer 110 may be a terminal 100 computer 110. In uplink communication, a transmitter may be a terminal 100 computer 110 and a receiver-side computer 110 may be a satellite 130 computer 110.

A receiver-side computer 110 may be programmed to detect a blocked burst $B_i$ based on a threshold scheme using a burst signal quality metric technique typically used for power control or link adaptation. In one example, a quality metric technique may be "Estimating RSSI" (Received Signal Strength Indicator) which is based on the power of the received signal. The received signal includes the desired communication signal plus noise and interference. In another example, "Estimating SNIR" (Signal-to-Noise-plus-Interference Ratio) technique includes individually estimating power of a desired communication signal and noise-plus-interference. Estimation of individual power level can be done using UW symbols or payload or both in the received communication signal. A blockage of a satellite link 150 typically results in lost data. In other words, transmitted data during a blockage (or interruption of the satellite link 150) may be lost, i.e., not received by an intended receiver. For example, the receiver-side computer 110 may be programmed to determine that a burst $B_i$ is lost due to blockage upon determining that the power amplitude of the received signal is less than a power threshold, e.g., −145 dBm.

Figure 4:
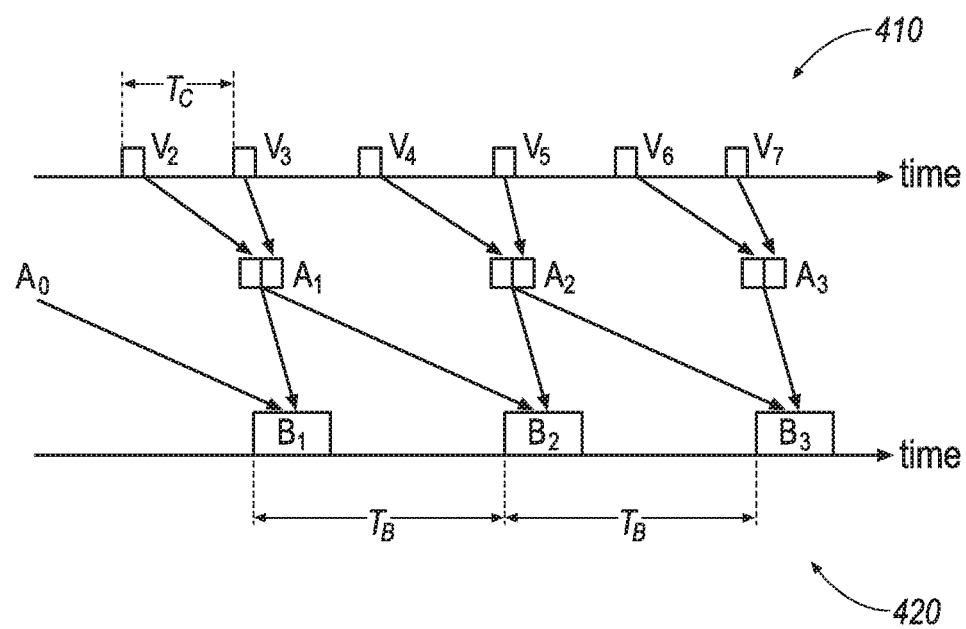
FIG. 4 illustrates a first graph of a sequence of data packets for transmission via the satellite link and a second graph of a sequence of bursts.

FIG. 4 illustrates in graph 410 an example sequence of data packets $V_0, V_1, \ldots, V_n$ with a data packet cycle time $T_C$, e.g., 20 ms. FIG. 4 further illustrates, in graph 320, an example sequence of bursts $B_1, B_2, B_3, \ldots$ with a burst cycle time $T_B$ that is two times the data packet cycle time $T_C$ (e.g., 40 ms). The computer 110 may be programmed to transmit the burst $B_i$ upon receiving every other data packet $V_i$. In this example, a burst $B_i$ includes the current data packet $V_i$, and three previous data packets $V_{i-3}, V_{i-2}, V_{i-1}$.

As discussed above, each burst $B_i$ includes, in addition to the payload other data, i.e., packet header data, such as satellite link 150 frequency, power of transmission via the satellite link 150, etc. This additional data consumes overhead, i.e., resources (e.g., time slots) of the communication medium, e.g., a satellite link 150. In this scheme, shown in example of FIG. 4, because of a lower rate of bursts $B_i$, i.e., the burst cycle time $T_B$ being more than data packet cycle time $T_C$, the communication has less overhead compared to the scheme shown in FIG. 3. Note each burst $B_i$ in the graph 420 includes more payload compared to each burst $B_i$ shown in the graph 320. If a burst $B_i$, e.g., the burst $B_2$ is lost due to a blockage, the data packets $V_2, V_3, V_4, V_5$, is lost due to a blockage, the data packets $V_2, V_3, V_4, V_5$ can be recovered at the receiver-side computer 110 as long as the receiver-side computer 110 receives the bursts $B_1, B_3$. The burst $B_1$ includes the data packets $V_2, V_3$, and the burst $B_3$ includes the data packets $V_4, V_5$.

FIG. 4 further shows aggregate packets $A_i$. "Aggregating" data packets, in the present context, means combining multiple data packets $V_i$ into an aggregate packet $A_i$ that includes a plurality of data packets $V_i, V_{i-j}$, etc. For example, a burst $B_2$ may include data from aggregate packets $A_1, A_2$. As shown in FIG. 4, the aggregate packet $A_1$ may include the data packets $V_2, V_3$, and the aggregate packet $A_2$ may include the data packets $V_4, V_5$. Thus, the payload of the burst $B_2$ may include data packets $V_2, V_3, V_4, V_5$.

Figure 5:
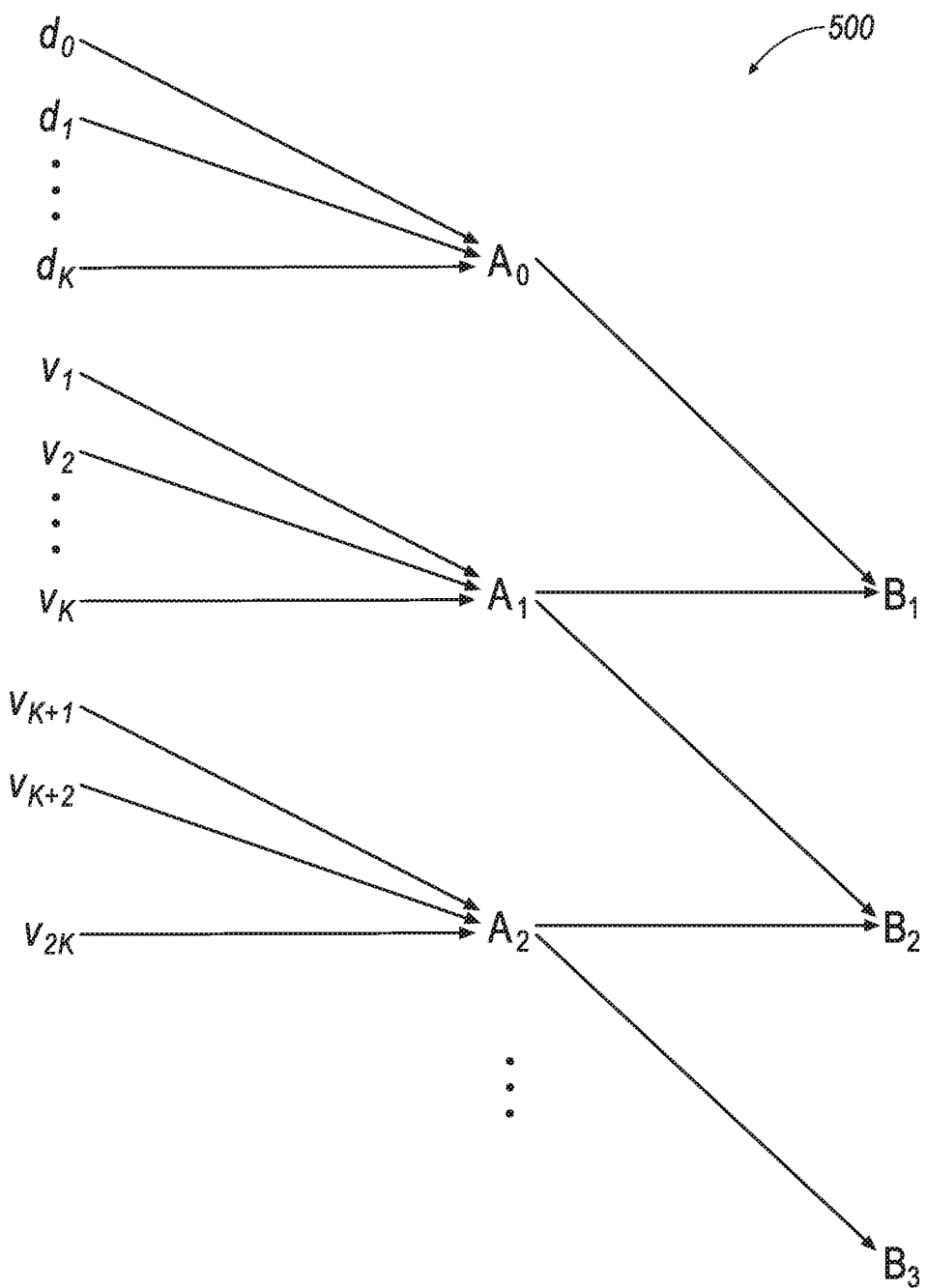
FIG. 5 shows a diagram for aggregating and generating bursts based on a plurality of data packets.

FIG. 5 shows an example diagram 500 for aggregating data packets $V_i$ and generating bursts $B_i$. A computer 110 may be programmed to generate a burst $B_i$ including the current data packet $V_{2k}$ and previous 2k-1 data packets $V_i$. Thus, a payload of each burst $B_i$ includes 2k data packets $V_i$. For example, as shown in diagram 500, the payload of the burst $B_2$ may include data packets $V_1, \ldots, V_{2k}$. The computer 110 may be programmed to aggregate each sequence of k data packets $V_i$, e.g., data packets $V_1, \ldots, V_k$, to an aggregate packet $A_i$, e.g., the aggregate packet $A_1$. The computer 110 may be programmed to generate a burst $B_i$ with a payload including a current aggregate packet $A_i$ (e.g., combining k data packets $V_{k+1}, \ldots, V_{2k}$) and a previous aggregate packet $A_{i-1}$ (e.g., combining k data packets $V_1, \ldots, V_k$). The number k can be any number, e.g., 1, 2, 3., etc. For example, FIG. 4 is an example implementation of FIG. 5 with k=2. Thus, in this example, each burst $B_i$ includes 2k (or 4) data packets $V_i$.

The computer 110 may be programmed to digitally modulate data to transmit via a satellite link 150 using various digital modulation techniques such as Phase-Shift Keying (PSK), Quadrature amplitude modulation (QAM), etc. Digital modulation is a process of mapping an input binary sequence into a constellation point set, as discussed below, by a modulation scheme. Digital modulation techniques generate one or more digital bitstream, i.e., digitally modulated data is in the digital domain. In the present document, a result of modulating an input x is presented as m(x).

PSK is an example digital modulation process that conveys data by changing the phase of a constant frequency reference signal (a carrier wave). For example, with the Quadrature PSK (QPSK) modulation scheme, two input binary bits are mapped to one of four constellations points (1+j, −1+j, −1-j,1-j) including real and imaginary elements. A constellation point is a representation of a signal modulated by a digital modulation scheme such as quadrature amplitude modulation or phase-shift keying using real and imaginary elements. QAM refers to a family of digital modulation methods. QAM conveys two digital bit streams by changing (modulating) amplitudes of two carrier waves using an amplitude-shift keying (ASK) digital modulation scheme.

With respect to a sequence of aggregating and digitally modulating packets, a digital modulation may be performed before or after aggregating (as further discussed below with reference to FIGS. 6-7). For example, the computer 110 may be programmed to modulate the current data packet $V_i$, to digitally modulate the previous data packet $V_{i-1}$, to then generate an aggregated data packet $A_i$ including the digitally modulated current data packet $m(V_i)$ and the digitally modulated previous data packet $m(V_{i-1})$, and then to generate the burst $B_i$ including the aggregated data packet $A_i$. In another example, the computer 110 may be programmed to generate an aggregated data packet $A_i$ including the current data packet $V_i$ and the previous data packet $V_{i-1}$, to digitally modulate the aggregated data packet $A_i$, and then to generate the burst $B_i$ including the digitally modulated aggregated data packet $m(A_i)$.

Referring to the diagram 500, the computer 110 may be programmed to modulate each of the current data packet $V_{2k}$ and the previous data packets $V_1, \ldots, V_{2k-1}$ separately, to generate an aggregated data packet $A_i$, $A_{i-1}$ including the modulated current data packet $m(V_{2k})$ and each of the separately modulated previous data packets $m(V_1), \ldots, m(V_{2k-i})$, and then to generate the burst $B_i$ including the aggregated data packet $A_i$, $A_{i-1}$. In yet another example, the computer 110 may be programmed to generate aggregated data packets $A_i$, $A_{i-1}$ including the current data packet $V_{2k}$ and each of the previous data packets $V_1, \ldots, V_{2k-1}$, to modulate the aggregated data packets $A_i$, $A_{i-1}$, then to generate the burst $B_i$ including the modulated aggregate packets $m(A_i)$, $m(A_{i-1})$.

Additionally, the computer 110 may be programmed to perform channel coding, scrambling, up-conversion, and/or digital-to-analog (DAC) conversion.

Channel coding means adding parity bits into a binary input sequence for forward error correction. A parity bit acts as a check on a set of binary values, calculated in such a way that a number of is in the set plus the parity bit should always be even (or odd, depending on how the parity bit generation process is specified). For example, the transmitter computer 110 may be programmed to add a parity bit to each of the data packets $V_i$.

Scrambling means adding (in modular 2) a binary pseudo-noise sequence (masking sequence) to an input bitstream to randomize a number of "0"s and "1"s in the output bitstream.

Up-conversion means converting a frequency of a signal to a satellite communication frequency of the satellite link 150, e.g., within the Ka, Q, or V band. For example, the computer 110 may be programmed to output the burst $B_i$ modulated to a Block Up-Converter (BUC) circuit that is configured to up-convert the burst $B_i$, based on a specified satellite communication frequency.

Digital-to-Analog (DAC) conversion means converting digital data such as bit stream to an analog signal, e.g., converting the up-converted burst $B_i$ to an analog signal for transmission via the satellite link 150. The computer 110 may be programmed to input the up-converted burst $B_i$ to a DAC circuit. An output of the DAC circuit may be electrically coupled to, e.g., a satellite 130 antenna or a terminal 100 antenna 120. To convert a complex number including real and imaginary values I, Q, for example, two DAC circuits may be used. A first DAC converts a digitally frequency translated signal $I \cos(W_{IF}t) - Q \sin(W_{IF}t)$ to a first analog signal and a second DAC converts a digitally frequency translated signal $I \sin(W_{IF}t) + Q \cos(W_{IF}t)$ to a second analog signal. In this context, $W_{IF}$ represents an IF (Intermediate Frequency) and t represents time. Each analog signal X(t) and Y(t) is further frequency upconverted to a communication frequency of the satellite link 150. An analog mixer with a LO (Local Oscillator) translates the frequency of X(t) and Y(t), and an analog adder then add them and output to an antenna (e.g., via an amplifier circuit).

Figure 6:
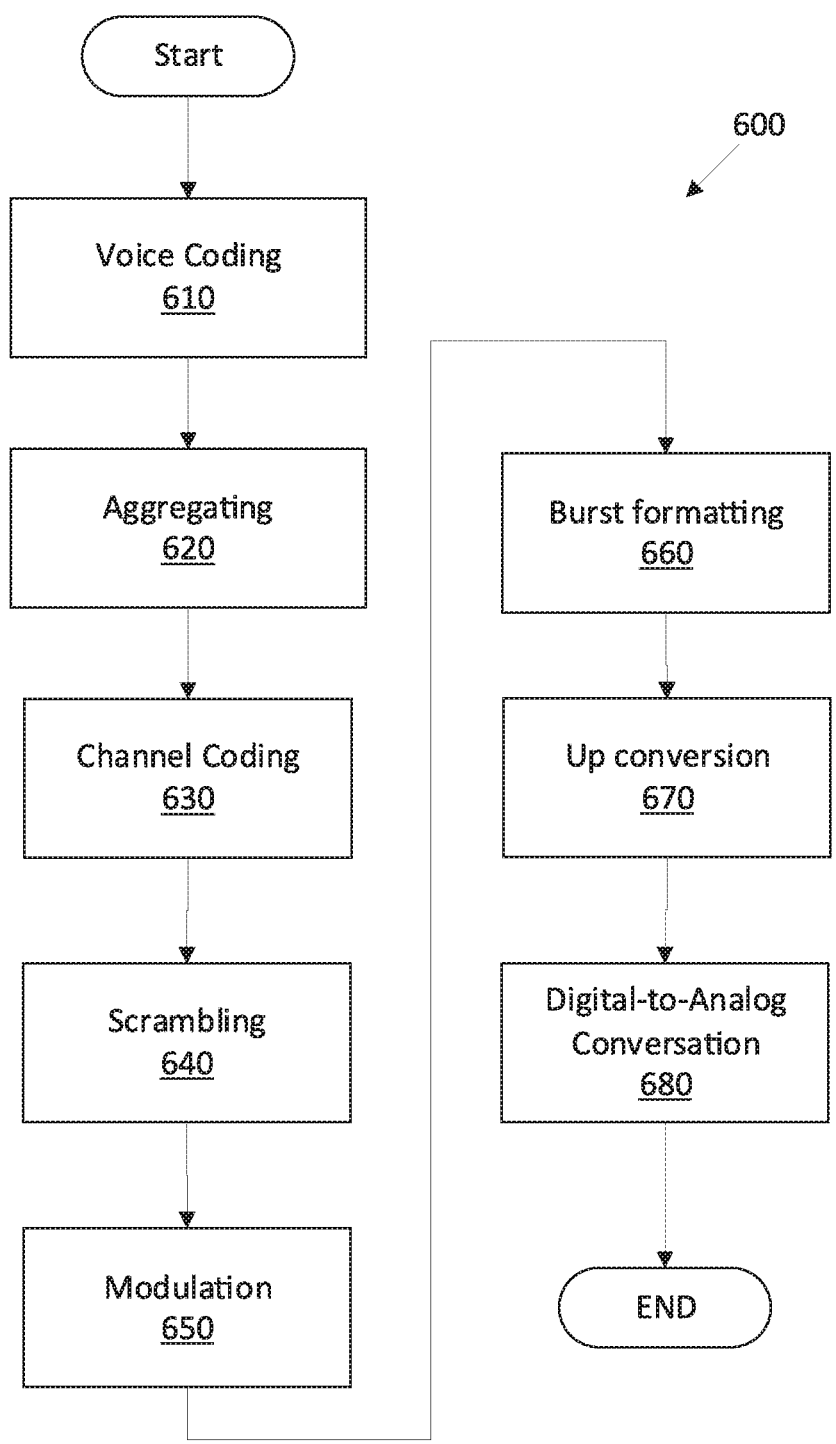
FIG. 6 is a flowchart of an example process for transmission of a sequence of data packets.

FIG. 6 is a flowchart of an example process 600 for transmission of a sequence of data packets $V_i$. A computer 110 of a transmitter, e.g., a satellite 130, a terminal 100, etc., may be programmed to execute blocks of the process 600.

The process 600 begins in a block 610, in which the computer 110 performs voice encoding for an input media, e.g., an analog signal received from a microphone, image data received from a camera sensor, etc. The computer 110 may be programmed to convert an audio signal to a media data packet $V_i$ using an ADC circuit. Additionally or alternatively, the computer 110 may be programmed to perform video coding, e.g., by generating video data packets $V_i$ based on received input audio and image data. In some examples, a data packet $V_i$ may be another type of data such as application data of a time-sensitive computer application, i.e., in some examples, the block 610 may be omitted.

Next, in a block 620, the computer 110 aggregates a current data packet $V_i$ and one or more previous data packets. In one example, with reference to FIG. 4, the computer 110 may be programmed to generate an aggregate packet $A_i$ including the current data packet $V_i$ and a previous data packet $V_{i-1}$. In another example, with reference to FIG. 5, the computer 110 may be programmed to aggregate a current data packet $V_{2K}$ and 2k-1 previous data packets $V_{k+1}, \ldots, V_{2k-1}$.

Next, in a block 630, the computer 110 performs channel coding. Channel coding means adding parity bits into a binary input sequence for forward error correction. A parity bit acts as a check on a set of binary values, calculated in such a way that a number of is in the set plus the parity bit should always be even. The computer 110 may be programmed to perform channel coding by calculating a parity bit for each aggregate packet $A_i$ and adding the calculated parity bit to the data packet $A_i$. Additionally or alternatively, the computer 110 may be programmed to perform any other channel coding technique, e.g., using Cyclic Redundancy Check (CRC).

Next, in a block 640, the computer 110 performs scrambling. The computer 110 may be programmed to add a binary pseudo-noise sequence to the aggregate packet $A_i$.

Next, in a block 650, the computer 110 digitally modulates the aggregate packets $A_i$. The computer 110 may be programmed to digitally modulate the aggregate packets $A_i$ using a digital modulation technique such as QPSK, QAM, etc.

Next, in a block 660, the computer 110 performs burst formatting. By performing burst formatting, the computer 110 may generate a burst $B_i$, based on the aggregate packets $A_i$ including modulated data packets $m(V_i)$. In one example, with reference to FIGS. 4-5, the computer 110 may be programmed to generate a burst $B_i$ with a payload including the aggregate packets $A_i$, $A_{i-1}$.

Next, in a block 670, the computer 110 up-converts the burst $B_i$, e.g., based on a satellite link 150 frequency band such as Ka, Q, or V band. The computer 110 may input the burst $B_i$ to a BUC to generate an up-converted bitstream.

Next, in a block 680, the computer 110 performs a DAC conversion, e.g., by inputting the up-converted bitstream to a DAC converter electrically coupled to an antenna, e.g., via an amplifier. In one example, the real and imaginary values I, Q may be converted to analog values using two DAC circuits, as discussed above.

Following the block 680, the process 600 ends, or return to the block 610, although not shown in FIG. 6.

As discussed above, in various examples aggregating can be performed before or after modulating. FIG. 7 is a flowchart of another example process 700 for transmission of a sequence of data packets $V_i$, in an alternative sequence from that of FIG. 6. A computer 110 of a transmitter, e.g., a satellite 130, a terminal 100, etc., may be programmed to execute blocks of the process 700.

The process 700 begins in a block 710, in which the computer 110 performs voice encoding for an input media.

As discussed above, alternative coding schemes may be implemented or, in some examples, the block 710 may be omitted.

Next, in a block 720, the computer 110 performs channel coding. The computer 110 may be programmed to perform channel coding by calculating a parity bit for each data packet $V_i$ and adding the calculated parity bit to the data packet $V_i$. Additionally or alternatively, the computer 110 may be programmed to perform any other channel coding technique, e.g., using Cyclic Redundancy Check (CRC).

Next, in a block 730, the computer 110 performs scrambling. The computer 110 may be programmed to add a binary pseudo-noise sequence to each data packet $V_i$.

Next, in a block 740, the computer 110 digitally modulates the data packet $V_i$. The computer 110 may be programmed to digitally modulate the data packet $V_i$ using a digital modulation technique such as QPSK, QAM, etc.

Next, in a block 750, the computer 110 aggregates the modulated data packet $m(V_i)$. In one example, with reference to FIG. 4, the computer 110 may be programmed to generate an aggregate packet $A_i$ including the current modulated data packet $m(V_i)$ and a previous modulated data packet $m(V_{i-1})$. In another example, with reference to FIG. 5, the computer 110 may be programmed to aggregate a current modulated data packet $m(V_{2K})$ and k-1 previous modulated data packets $m(V_{k+1}), \ldots, m(V_{2k-1})$.

Next, in a block 760, the computer 110 performs burst formatting. By performing burst formatting, the computer 110 may generate burst $B_i$ based on the aggregate packets $A_i$ including modulated data packets $m(V_i)$. In one example, with reference to FIGS. 4-5, the computer 110 may be programmed to generate a burst $B_i$ with a payload including the aggregate packets $A_i$, $A_{i-1}$.

Next, in a block 770, the computer 110 up-converts the burst $B_i$, e.g., based on a satellite link 150 frequency band such as Ka, Q, or V band. The computer 110 may input the burst $B_i$ to a BUC to generate an up-converted bitstream.

Next, in a block 780, the computer 110 performs a DAC conversion, e.g., by inputting the up-converted bitstream to a DAC converter. The signal output of the DAC, i.e., the analog signal, is then transmitted via a satellite link 150 to a receiver.

Figure 7:
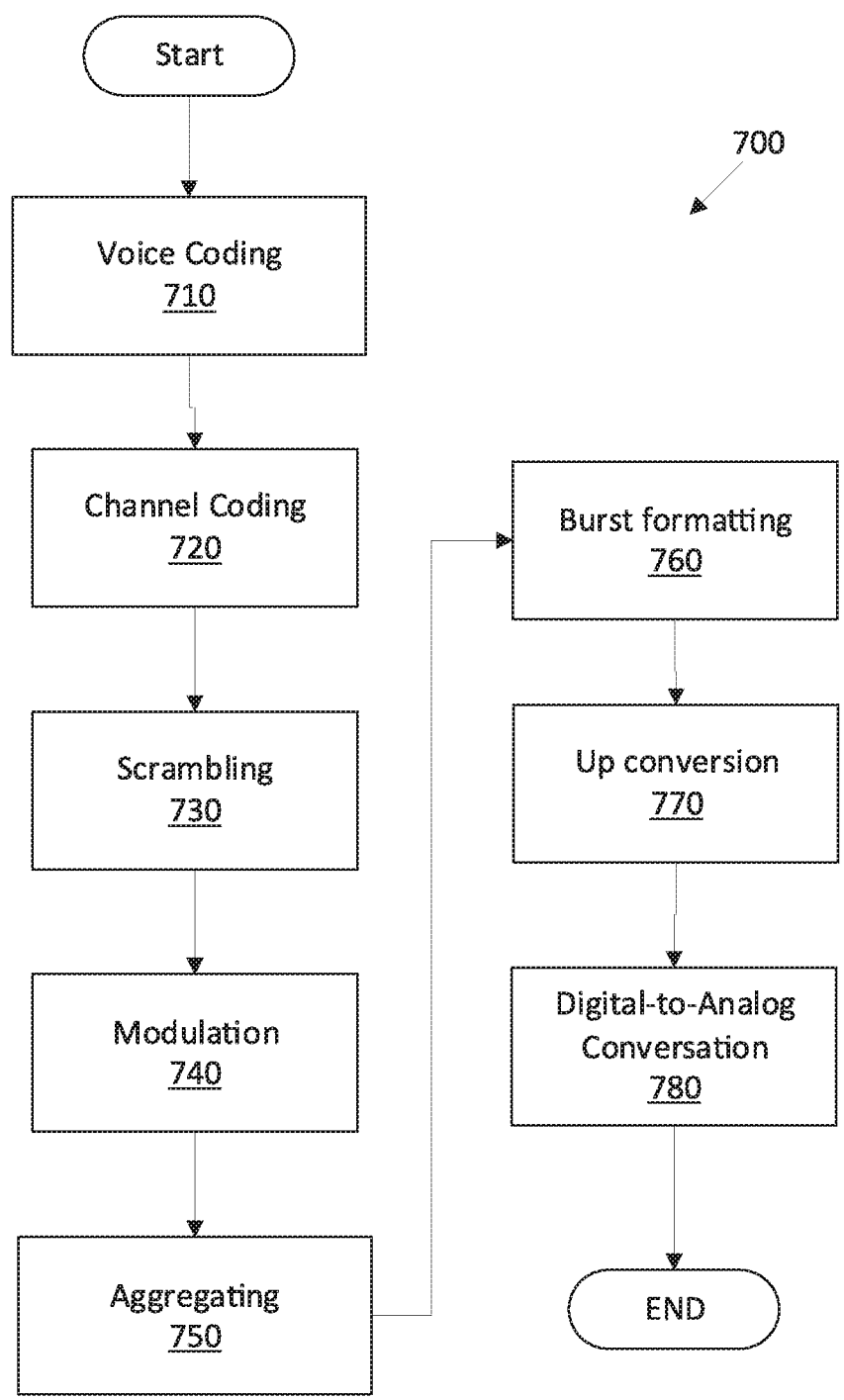
FIG. 7 is a flowchart of another example process for transmission of a sequence of data packets.

Following the block 780, the process 700 ends, or return to the block 710, although not shown in FIG. 7.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A wireless communication transmitter comprising a processor and a memory, the memory storing instructions executable by the processor to, upon receiving a sequence of data packets including a first, a second, and a third data packet, digitally modulate each of the first, the second, and the third data packets separately, generate aggregated data packets including the separately digitally modulated first, second, and third data packets, and wirelessly transmit a first burst and a second burst to a second computer, wherein the first burst includes the first and the second data packets and the second burst includes the second and the third data packets.

2. The wireless communication transmitter of claim 1, wherein the instructions further include instructions to:
generate an aggregated data packet including the first data packet and the second data packet;
digitally modulate the aggregated data packet; and
then generate the first burst including the digitally modulated aggregated data packet.

3. The wireless communication transmitter of claim 1, wherein the instructions further include instructions to transmit a burst upon receiving every other data packet.

4. The wireless communication transmitter of claim 3, wherein the instructions further include instructions to:
digitally modulate each of the current and three previous data packets separately;
generate an aggregated data packet including the digitally modulated current data packet and each of the separately digitally modulated previous data packets; and
then generate a third burst including the aggregated data packet.

5. The wireless communication transmitter of claim 3, wherein the instructions further include instructions to:
generate an aggregated data packet including the current data packet and each of the plurality of previous data packets;
digitally modulate the aggregated data packet; and
then generate the third burst including the digitally modulated aggregated data packet.

6. The wireless communication transmitter of claim 1, wherein the wireless communication transmitter is one of a satellite or a satellite terminal.

7. The wireless communication transmitter of claim 1, wherein the data packet includes a media data packet.

8. The wireless communication transmitter of claim 7, wherein the media data packet includes a VoIP data packet.

9. The wireless communication transmitter of claim 8, wherein the instructions further include instructions to perform voice encoding, channel coding, scrambling, digitally modulating, aggregating, and burst formatting.

10. The wireless communication transmitter of claim 8, wherein the digitally modulating is performed before the aggregating.

11. The wireless communication transmitter of claim 1, wherein the instructions further include instructions to:
generate an aggregated data packet including the second data packet and the third data packet;
digitally modulate the aggregated data packet; and
then generate the second burst including the digitally modulated aggregated data packet.

12. A method, comprising:
upon receiving, in a first computer, in a sequence of data packets including a first, a second, and a third data packet, digitally modulating each of the first, the second, and the third data packets separately, generating aggregated data packets including the separately digitally modulated first, second, and third data packets, and wirelessly transmitting a first burst and a second burst to a second computer, wherein the first burst includes the first and the second data packets and the second burst includes the second and the third data packets.

13. The method of claim 12, further comprising:
generating an aggregated data packet including the first data packet and the second data packet;
digitally modulating the aggregated data packet; and
then generating the first burst including the digitally modulated aggregated data packet.

14. The method of claim 12, further comprising transmitting a burst upon receiving every other data packet to include a current data packet and a plurality of previous data packets.

15. The method of claim 14, further comprising:
digitally modulating each of the current and three previous data packets separately;
generating an aggregated data packet including the digitally modulated current data packet and each of the separately digitally modulated previous data packets; and
then generating a third burst including the aggregated data packet.

16. The method of claim 14, further comprising:
generating an aggregated data packet including the current data packet and each of the plurality of previous data packets;
digitally modulating the aggregated data packet; and
then generating the third burst including the digitally modulated aggregated data packet.

17. The method of claim 12, further comprising performing voice encoding, channel coding, scrambling, digitally modulating, aggregating, and burst formatting, wherein the data packet includes a media data packet.

18. The method of claim 17, wherein the digitally modulating is performed before the aggregating.

19. The method of claim 17, wherein the media data packet includes a VoIP data packet.

20. The method of claim 12, further including:
generating an aggregated data packet including the second data packet and the third data packet;
digitally modulating the aggregated data packet; and
then generating the second burst including the digitally modulated aggregated data packet.

\* \* \* \* \*